United States Patent [19]

Krechel et al.

[11] Patent Number: 4,616,677

[45] Date of Patent: Oct. 14, 1986

[54] MANIFOLD FITTING FOR A COMPRESSED AIR TANK

[75] Inventors: Joseph L. Krechel, Ladue; Michael J. Purvis, Fenton, both of Mo.

[73] Assignee: Control Devices, Incorporated, St. Louis, Mo.

[21] Appl. No.: 723,135

[22] Filed: Apr. 15, 1985

Related U.S. Application Data

[63] Continuation of Ser. No. 474,806, Mar. 14, 1983, abandoned.

[51] Int. Cl.$^4$ ............................................. F16K 11/10
[52] U.S. Cl. .................................... 137/881; 137/878; 137/886
[58] Field of Search .................. 137/542, 543.13, 878, 137/881, 885, 886

[56] References Cited

U.S. PATENT DOCUMENTS

| | | | |
|---|---|---|---|
| 1,472,265 | 10/1923 | Bell | 137/883 |
| 1,558,789 | 10/1925 | Carrey | 137/886 |
| 2,385,489 | 9/1945 | Benz | 137/886 |
| 2,518,569 | 8/1950 | Pierson | 137/602 X |
| 3,288,162 | 11/1966 | Gary | 137/886 X |
| 3,435,847 | 4/1969 | Cooley | 137/881 |
| 3,448,765 | 6/1969 | McKinney | 137/543.13 X |
| 3,583,441 | 6/1971 | Grant et al. | 137/625.48 |
| 3,702,141 | 11/1972 | Witterhorn | 137/542 X |

FOREIGN PATENT DOCUMENTS

| | | | |
|---|---|---|---|
| 1074130 | 10/1954 | France | 137/886 |
| 723184 | 2/1955 | United Kingdom | 137/886 |

Primary Examiner—A. Michael Chambers
Assistant Examiner—John C. Fox
Attorney, Agent, or Firm—Senniger, Powers, Leavitt and Roedel

[57] ABSTRACT

A manifold fitting for a compressed air tank having an elongate main body with a passage therethrough from one end to the other. The main body has an end portion at one end of the passage adapted for attachment of the fitting to a tank and a second end portion at the other end of the passage. The main body further has an outlet member, a valve member, and a pressure relief safety valve, each of which are threaded into lateral openings in the main body. A fourth threaded lateral opening is provided for a pressure gauge.

5 Claims, 5 Drawing Figures

U.S. Patent  Oct. 14, 1986  4,616,677
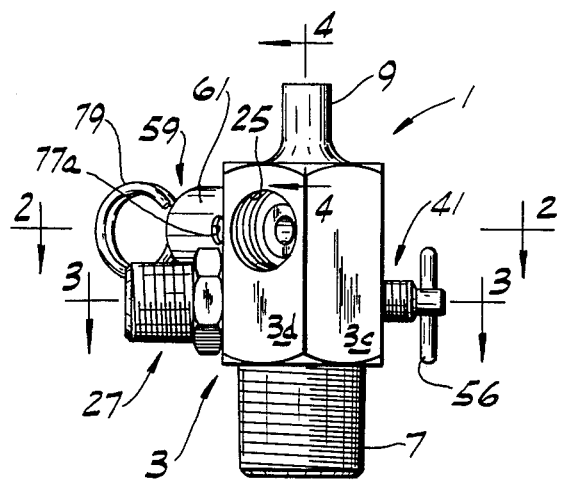
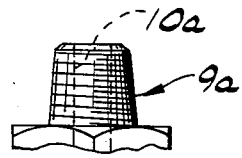
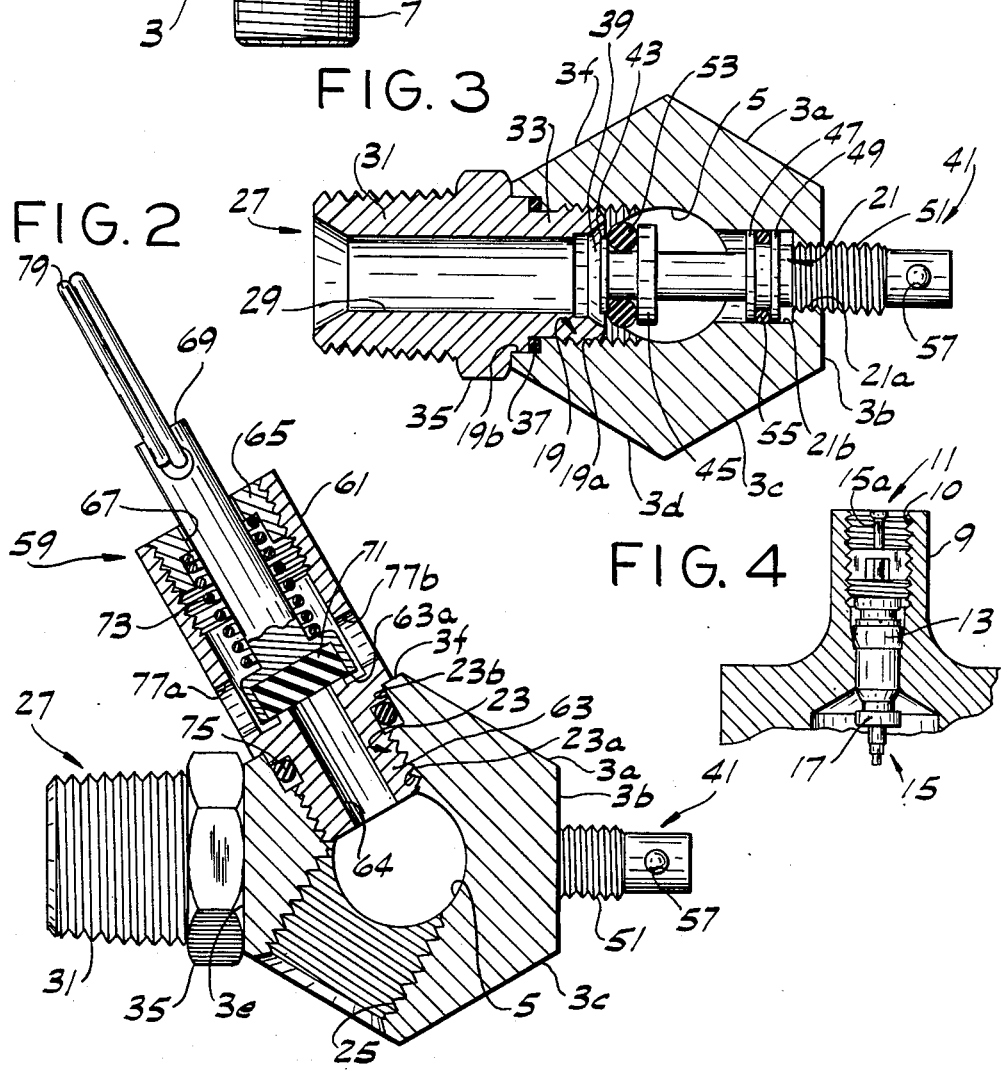

MANIFOLD FITTING FOR A COMPRESSED AIR TANK

This is a continuation of application Ser. No. 474,806, filed Mar. 14, 1983, abandoned.

BACKGROUND OF THE INVENTION

This invention relates to a manifold fitting, and more particularly to a manifold fitting for a compressed air tank.

The invention is in the same general field as the manifold assembly shown in U.S. Pat. No. 4,120,319 issued Oct. 17, 1978 and involves improvements thereover.

SUMMARY OF THE INVENTION

Among the several objects of this invention may be noted the provision of a manifold fitting for a compressed air tank with components which can be easily interchanged; the provision of such a manifold fitting that has the flexibility of changing to various configurations; and the provision of such a manifold fitting which is simple in construction, inexpensive to manufacture, easy to install and reliable in operation.

In general, a manifold fitting of this invention is designed for a compressed air tank and comprises an elongate main body having a passage therethrough from one end to the other. The body has an externally threaded end portion at one end of the passage for attachment of the fitting to a tank for communication with the tank and a second end portion at the other end of the passage. An outlet member is threaded in a first lateral opening in the main body and has a valve seat at its inner end. A valve member is threaded in a second lateral opening in the main body opposite the outlet opening and in axial alignment with the outlet member. The valve member extends across the passage with space around it for flow of air through the passage. The valve member is adapted to be threaded inwardly in the second lateral opening for engagement of its inner end with the valve seat and to be threaded outwardly with respect to the second lateral opening to an open position for flow of air from the tank through the passage and the outlet member. A pressure relief safety valve is provided comprising a body having a vent port therein, a valve member movable in the body from a closed position blocking said port to an open position for escape of air through the port and spring means for biasing the valve member to its closed position. The safety valve body is threaded at one end constituting its inner end in a third lateral opening in the main body. The main body further has a fourth threaded lateral opening for a pressure gauge.

Other objects and features will be in part apparent and in part pointed out hereinafter.

BRIEF DESCRIPTION OF THE DRAWINGS

FIG. 1 is a side elevation of a manifold fitting of this invention;

FIG. 2 is a transverse section on line 2—2 of FIG. 1;

FIG. 3 is a transverse section on line 3—3 of FIG. 1;

FIG. 4 is an enlarged vertical section on line 4—4 of FIG. 1 showing a filler valve; and FIG. 5 is a view illustrating a second embodiment of the invention.

Corresponding reference characters indicate corresponding parts throughout the several views of the drawings.

DESCRIPTION OF THE PREFERRED EMBODIMENT

Referring now to the drawings, a manifold fitting of this invention, generally designated 1, is shown to comprise an elongate main body 3 of hexagonal cross-section, its six faces being designated 3a, 3b, 3c, 3d, 3e and 3f. The body has a longitudinal passage 5 extending therethrough from one end to the other, being of generally circular cross-section as shown in FIG. 2. Body 3 has an externally threaded first end portion 7 at one end of the passage for attachment of the fitting 1 to a tank (not shown) for communication with the tank, and a second end portion 9 at the other end of the passage 5.

As shown in FIGS. 1 and 5, in one embodiment of the invention the second end portion 9 has a passage 10 therethrough which is threaded and an unthreaded exterior. A filler check valve 11 is threaded in passage 10 for filling the tank with compressed air via application of a coupling at the end of a compressed air supply line (not shown). The check valve 11, as shown in FIG. 5, is of the conventional well-known type used for inflating tires, having a tubular body 13, a stem 15 therethrough and a spring (not shown) therein. The stem 15 has a valve member 17 for blocking the inner end of the body 13 and is held against the opening by the spring. Air is permitted to pass through the body and passage 10 of the second end portion 9 by pressing inwardly on the outer portion 15a of the stem, thereby moving the valve member 17 away from the inner opening of the body and unblocking the passage through the check valve's body 13. A second embodiment of the invention having a different end portion 9a is shown in FIG. 5. Here the second end portion 9a is externally threaded and has an unthreaded passage 10a therethrough. End portion 9a is for threading a pressure-sensitive switch (not shown) thereon.

The main body 3 further has four threaded lateral openings 19, 21, 23 and 25 therein. The first lateral opening 19, which is an outlet opening, is in face 3e of the main body and has a threaded inner portion 19a and an unthreaded outer end counterbore 19b of slightly larger diameter than the inner portion 19a. The second lateral opening 21 is in face 3b opposite face 3e and in axial alignment with the outlet opening 19. The second opening 21 has a threaded outer portion 21a and an unthreaded inner end counterbore 21b of greater diameter than the outer portion 21a but of smaller diameter than portion 19a of opening 19. The third lateral opening 23 is in face 3f and, like the first opening 19, has a threaded inner end portion 23a and an unthreaded outer end counterbore 23b of slightly greater diameter than the inner portion 23a. The fourth lateral opening 25 is in face 3d of the main body, of uniform diameter and threaded. The location of the openings along the body 3 is not crucial to the operation of this invention except that the outlet opening 19 and the second lateral opening 21 must be in axial alignment with each other.

An outlet member 27 illustrated as being a nipple comprising a tubular body with a passage 29 therethrough, outer and inner threaded portions 31 and 33 and a hexagonal head 35 therebetween is adapted to be threaded in the first lateral opening 19 with the inner portion 33 in communication with passage 5. The diameter of the outer portion 31 of the outlet nipple 27 is greater than that of the inner end portion 33, and the outer portion 31 is adapted to threadably receive an air line for the flow of compressed air from the tank, through passages 5 and 29, and into the line. An O-ring seal 37 is provided on the inner portion of the nipple 27 adjacent its hexagonal head 35 to seal the outlet opening 19 at the junction of its inner and outer portions 19a and 19b when the outlet nipple 27 is threaded therein. The hexagonal head 35 is adapted to receive a suitable tool for tightening the outlet nipple in the opening 19.

The outlet nipple 27 has a valve seat 39 at its inner end. A valve member 41 cooperable with the seat 39 is threadably fitted in the second lateral opening 21. It comprises a cylindrical stem with first and second rings 43 and 45 at the inner end thereof, third and fourth rings 47 and 49 intermediate its ends and a threaded outer end portion 51. An O-ring seal 53 disposed between the first and second rings 43 and 45 is adapted to engage the valve seat at the inner end of the outlet nipple 27 to block the passage of air through the outlet nipple, ring 43 being of smaller diameter than ring 45. A second O-ring seal 55 between the third and fourth rings 47 and 49 provides a slidable seal in the inner portion 21b of the second opening 21. The valve member 41 is threaded from the inside to the outside in the second lateral opening 21 and extends across the passage 5 with space therearound for the flow of air (see FIG. 3). The valve member 41 is adapted to be threaded inwardly in the second lateral opening 21 for engagement of the O-ring seal 53 with the valve seat 39 and outwardly with respect to the second lateral opening 21 to an open position for the flow of air from the tank through the passage 5 and through the outlet nipple passage 29. A pin 56 is inserted in a hole 57 in the outer end of the valve member 41 for turning the member for inward and outward movement.

A pressure relief safety valve 59 is threaded in the third lateral opening 23 in the main body 3. This comprises a cylindrical body 61 having a reduced-diameter externally threaded inner end portion 63 formed to provide a valve seat 63a and having a passage 64 through said inner end portion (and seat) for flow of air to the body 61. A closure head 65 is threaded in the outer end of body 61. The closure head has a central opening 67. A stem 69 slidable in opening 67 has a valve head 71 at its inner end within the cylindrical body 61 engageable with the seat 63a. Spring means 73 interposed between the valve head 71 and the closure 65 and biases the valve head 71 to its closed position engaging the seat. An O-ring seal 75 seals the outlet opening 23 at the junction of its inner 23a and outer 23b end portions when the safety valve 59 is threaded therein. The body 61 further has two lateral ports 77a, 77b in alignment with each other for the escape of air. Air is vented from the tank through ports 77a and 77b when the force of air on the valve head 71 exceeds the opening bias or on manually pulling the stem 69 by means of a ring 79 at the outer end of the stem 69.

The main body further has a fourth threaded lateral opening 25 adapted to receive a pressure gauge (not shown) for determining the pressure in the compressed air tank.

A significant advantage of the manifold fitting of this invention is its flexibility so far as the manufacturer is concerned for supplying it in different configurations to suit users' different requirements. Thus, for example, using the same main body 3, the manufacturer may supply the fitting with a so-called code (A.S.M.E. approved) safety valve or a non-code safety valve at 59, i.e., one type or the other may be threaded in opening 23. Also, the manufacturer may supply the fitting with an outlet member at 27 having a female thread instead of the male thread at 31, the outlet member being threaded in the opening 19 and having a valve seat the same as at 39.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A manifold fitting for a compressed air tank comprising:

an elongate main body of hexagonal cross-section with first and second ends of reduced circular cross-section;

said body having an axial passage therethrough from one end to the other;

said first end being externally threaded for attachment of the fitting to a tank for communication with the tank via the portion of the axial passage in said first reduced end;

said body having a first lateral opening extending inwardly to said axial passage from a first face of the six faces of the body;

an outlet member threaded in said first lateral opening in the body having a valve seat at its inner end toward said passage;

said second reduced end being adapted for passage of air via the portion of said axial passage therein;

said body having a second lateral opening extending inwardly to said passage from a second of the six faces of the body opposite said first face, said second lateral opening being opposite said first lateral opening and in axial alignment therewith;

a valve member threaded in said second lateral opening extending across said passage with space around said valve member for flow of air, said valve member being adapted to be threaded inwardly in said second lateral opening for engagement of its inner end with the valve seat and to be threaded outwardly with respect to said second lateral opening to an open position for flow of air from the tank through said passage and through said outlet member;

said body having a third lateral opening extending inwardly from a third of said six faces to said passage;

a pressure relief safety valve comprising a valve body threaded at one end constituting its inner end in said third lateral opening in the body, a vent port in the valve body, a valve member movable in the valve body from a closed position blocking said port to an open position for escape of air through the port, and spring means for biasing the valve member to its closed position; and said body having a fourth threaded lateral opening extending inwardly from a fourth of said faces to said passage for receiving a pressure gauge.

2. A manifold fitting as set forth in claim 1 wherein said reduced second end of the body has a filler check valve therein for filling the tank with compressed air via application of a coupling at the end of a compressed air supply line to said reduced second end.

3. A manifold fitting as set forth in claim 1 wherein said reduced second end of the main body is externally threaded for application thereto of a pressure-sensitive switch.

4. A manifold fitting as set forth in claim 1 wherein said fourth face of the body is the side opposite the third face and said fourth opening is aligned with said third opening.

5. A manifold fitting as set forth in claim 1 wherein said pressure relief safety valve comprises a cylindrical body having an inner end portion threaded in said third lateral opening, and a valve seat closure at the outer end of said cylindrical body, a stem slidable in an opening in the closure, a valve head at the end of the stem within the cylindrical body, spring means interposed between the valve head and closure for biasing the valve head to closed position engaging the seat, said stem having means at its outer end for manually pulling it to an opened position.

* * * * *